(12) United States Patent
Kittrell et al.

(10) Patent No.: US 7,469,210 B1
(45) Date of Patent: Dec. 23, 2008

(54) OUTBOUND VOICE SIGNATURE CALLS

(75) Inventors: Clayton Kittrell, Baton Rouge, LA (US); Benjamin Wright, Dallas, TX (US); Ray Grubbs, Ridgeland, MS (US)

(73) Assignee: Voice Signature LLC, Baton Rouge, LA (US)

( * ) Notice: Subject to any disclaimer, the term of this patent is extended or adjusted under 35 U.S.C. 154(b) by 824 days.

(21) Appl. No.: 10/692,462

(22) Filed: Oct. 23, 2003

Related U.S. Application Data

(63) Continuation-in-part of application No. 10/666,534, filed on Sep. 19, 2003, and a continuation-in-part of application No. 10/367,964, filed on Feb. 19, 2003, and a continuation-in-part of application No. 10/214,444, filed on Aug. 8, 2002.

(60) Provisional application No. 60/420,648, filed on Oct. 23, 2002.

(51) Int. Cl.
*G10L 21/06* (2006.01)

(52) U.S. Cl. ............... 704/270; 379/88.02; 379/88.13

(58) Field of Classification Search .............. 704/270; 379/88.02, 88.13
See application file for complete search history.

(56) References Cited

U.S. PATENT DOCUMENTS

| | | | |
|---|---|---|---|
| 3,879,751 A | 4/1975 | Gimelli | |
| 4,914,586 A | 4/1990 | Swinehart et al. | |
| 4,949,379 A | 8/1990 | Cordell | |
| 4,991,205 A | 2/1991 | Lemelson | ............ 713/186 |
| 5,005,200 A | 4/1991 | Fischer | |
| 5,091,975 A | 2/1992 | Berger et al. | |
| 5,126,543 A | 6/1992 | Bergeron et al. | |
| 5,247,497 A | 9/1993 | Cohn | |
| 5,436,972 A | 7/1995 | Fischer | |
| 5,544,255 A | 8/1996 | Smithies et al. | |
| 5,577,120 A | 11/1996 | Penzias | |
| 5,647,017 A | 7/1997 | Smithies et al. | |
| 5,758,323 A | 5/1998 | Case | ............ 704/9 |

(Continued)

FOREIGN PATENT DOCUMENTS

JP 9161494 6/1997

OTHER PUBLICATIONS

UNCITRAL Model Law on Electronic Signatures with Guide to Enactment 2001; United Nations Publication Sales No. E.02.V.8, ISBN 92-1-133653-8, 74 pages, 2001.

(Continued)

*Primary Examiner*—Susan McFadden
(74) *Attorney, Agent, or Firm*—Steptoe & Johnson LLP

(57) ABSTRACT

A voice signature system includes a data store, an interface code segment operable to receive identification of information to be signed and a phone number, and a signature process code segment operable to place an outbound telephone call to the phone number and capture a voice recording. The voice signature system is operable to create a voice signature using the voice recording and the identification of information to be signed. A method for creating voice signatures includes receiving an identification of information to be signed, receiving a phone number, placing an outbound call to the phone number, creating a voice recording of at least a portion of the outbound call, and creating a voice signature using the identification of information to be signed and the voice recording.

22 Claims, 3 Drawing Sheets

U.S. PATENT DOCUMENTS

| | | | |
|---|---|---|---|
| 5,818,955 A | 10/1998 | Smithies et al. | |
| 5,832,464 A | 11/1998 | Houvener et al. | 705/45 |
| 6,055,552 A | 4/2000 | Curry | 715/530 |
| 6,091,835 A | 7/2000 | Smithies et al. | |
| 6,185,316 B1 | 2/2001 | Buffam | |
| 6,199,049 B1 | 3/2001 | Conde et al. | 705/24 |
| 6,209,095 B1 | 3/2001 | Anderson et al. | 713/176 |
| 6,266,635 B1 * | 7/2001 | Sneh | 704/235 |
| 6,289,304 B1 | 9/2001 | Grefenstette | 704/9 |
| 6,381,344 B1 | 4/2002 | Smithies et al. | 382/115 |
| 6,389,402 B1 | 5/2002 | Ginter et al. | 705/51 |
| 6,400,806 B1 * | 6/2002 | Uppaluru | 379/88.02 |
| 6,802,041 B1 | 10/2004 | Rehm | 715/500.1 |
| 7,065,198 B2 * | 6/2006 | Brown et al. | 379/202.01 |
| 7,089,280 B1 * | 8/2006 | Satapathy et al. | 709/203 |
| 2002/0031209 A1 | 3/2002 | Smithies et al. | |
| 2002/0095601 A1 | 7/2002 | Hind et al. | 713/201 |
| 2002/0118220 A1 | 8/2002 | Lui et al. | 345/709 |
| 2002/0188497 A1 | 12/2002 | Cerwin | 705/10 |
| 2003/0033241 A1 | 2/2003 | Haradi | 705/38 |
| 2003/0093679 A1 | 5/2003 | Hawkins et al. | 713/181 |
| 2003/0154172 A1 | 8/2003 | Guyan et al. | 705/80 |

OTHER PUBLICATIONS

Lisa Broderick et al., "John Hancock Reinvented: Using Keys and Other Handy Things As Electronic Signatures", PenOp, Inc. 1998, pp. 1-8.

Benjamin Wright, "Eggs in Baskets: Distributing the Risks of Electronic Signatures", http://efa.org/digsig/penop03.txt, Jun. 22, 1995, pp. 1-10.

Benjamin Wright, "The Law of Digital Signatures", Jul. 2002, pp. 1-8.

Illinois Electronic Commerce Security Act With Comments—Final Version, file:///Dl/ecommerce/legis/ill-esca.html, 1998, pp. 1-49.

Department of Health and Human Services, Food and Drug Administration; 21 CFR Part 1 1, Mar. 20, 1997; pp. 13429-13466.

Preliminary Specifications for Electronic Mortgage Loan Documentation; Jun. 2001, Freddie Mac. pp. 1-52.

One Hundred Sixth Congress of the United States of America, Second Session, Jan. 24, 2000, pp. S.761.1-S.761-13.

Patricia B. Fry, Drafting Committee Memorandum for April UETA Meeting; 2 pages.

Office of Management and Budget, Implementation of the Government Paperwork Elimination Act; http://www.whitehouse.gov/omb/fedreg/print/gpea2.html. May 2, 2000.

Web VoiceID.com; http://tompritchard.com/voiceid/welcome.html, Copyright 2000-2002, pp. 1-3.

"Records Management Guidance for Agencies Implementing Electronic Signature Technologies", National Archives and Records Administration, Oct. 18, 2000; pp. 1-18.

Benjamin Wright, Esq., "The Legality of the PenOp® Signature", PenOp Resource Center, Second Edition, 1994, pp. 1-24.

Kathy Lyons-Burke, "Federal Agency Use of Public Key Technology for Digital Signatures and Authentication", NIST Special Publication 800-25; pp. 1-30, Oct. 2000.

Benjamin Wright, supplement to "The Law of Electronic Commerce", Little, Brown and Company 1991, 1994 supplement pp. 43-45.

Benjamin Wright, "Ceremony™ is a Timely Tool for Satisfying E-Commerce Laws", PenOp Inc, 2000; 3 pages.

Selwood Research, Federal Trade Commission, E-Sign Study—Comment P004102, pp. 1-4, Mar. 16, 2001.

Misner, Robert L. "Tape Recordings, Business Transactions Via Telephone, and the Statute of Frauds," Iowa Law Review, vol. 61, pp. 941-964, 1976.

Congressional Record—Senate, S5284, Jun. 16, 2000.

Ellis Canning Company v. Arthur J. Bernstein. 348 F. Supp. 1212 (D. Colo. 1972).

"Seal-It." J&R Software. http://www.j-r-software.com. Apr. 4, 2002.

Allen v. Wachtendorf, 962 S. W.2d 279 (Tex.Appl. Corpus Christi 1998).

Balacheff, Boris, et al., "A Trusted Process to Digitally Sign a Document", NSPW '01, Cloudcroft, NM, Sep. 10-13, 2001, pp. 79-86 (plus 3 pages of citation: p. 1 from ACM and pp. 2-3 from LOC) [ACM 1-58113-457-6/01/0009].

Steinauer, Dennis D., et al., "Trust and Traceability in Electronic Commerce", StandardView, vol. 5, No. 3., Sep. 1997, pp. 118-124.

Molnar, David, "Signing Electronic Contracts", Crossroads, vol. 7, Issue 1, Sep. 2000, pp. 1-10 (plus citation page), downloaded from: www.acm.org/crossroads/xrds7-1/contract.html.

Gräther, Wolfgang, et al., "Enhancing Workflows by Web Technology", GROUP '97, Phoenix, AZ, 1997, pp. 271-280 [ACM 0-89791-897-5/97/11].

Cole, James, et al, "Extending Support for Contracts in ebXML", Australian Computer Science Communications, vol. 23, Issue 6, Jan. 2001, pp. 119-127 (plus citation page) [IEEE 0-7695-0960-6/01].

Lemay Laura, "Teach Yourself Web Publishing with HTML 4 in 14 days," 2nd Professional Reference Edition, Sams.net Publishing, Indianapolice, IN, © 1997, pp. 99-105, 248-257 and 265.

Thimm, Heiko, "The Enhanced CSCW Teleservice for Wide Area Cooperative Authoring of Multimedia Documents", SIGOIS Bulletin, vol. 15 No. 2, Dec. 1994, pp. 49-57.

Mukhopadhyay, Sugata, et al., "Passive Capture and Structuring of Lectures", ACM Multimedia '99, Orlando, FL, Oct. 1999, pp. 477-487 [ACM 1-58113-151-8/99/0010].

Ströbel, Michael, "Communication Design for Electronic Negotiations on the Basis of XML Schema," WWW 10, Hong Kong, May 1-5, 2001, pp. 9-20 [ACM 1-58113-348-0/01/0005].

Asokan, N., et al., "Optimistic Protocols for Fair Exchange", Fourth ACM Conference on Computer and Communications Security, Zurich, Switzerland, © 1997, pp. 7-17 (plus citation page) [ISBN 0-89791-912-2].

UNCITRAL Model Law on Electronic Signatures with Guide to Enactment 2001; United Nations Publication Sales No. E.02.V.08, ISBN 92-1-133653-8, 74 pages, 2001.

Lisa Broderick et al., "John Hancock Reinvented: Using Keys and Other Handy Things As Electronic Signatures", PenOp, Inc. 1998, pp. 1-8.

Benjamin Wright, "Eggs in Baskets: Distributing the Risks of Electronic Signatures", http://efa.org/digsig/penop03.txt, Jun. 22, 1995, pp. 1-10.

Benjamin Wright, "The Law of Digital Signatures", Jul. 2002, pp. 1-8.

Illinois Electronic Commerce Security Act With Comments—Final Version, file:///Dl/ecommerce/legis/ill-esca.html, 1998, pp. 1-49.

Department of Health and Human Services, Food and Drug Administration; 21 CFR Part 1 1, Mar. 20, 1997: pp. 13429-13466.

Preliminary Specifications for Electronic Mortgage Loan Documentation; Jun. 2001. Freddie Mac. pp. 1-52.

One Hundred Sixth Congress of the United States of America, Second Session, Jan. 24, 2000, pp. S.761.1-S.761-13.

Patricia B. Fry, Drafting Committee Memorandum for April UETA Meeting; 2 pages.

Office of Management and Budget, Implementation of the Government Paperwork Elimination Act; http://wwww.whitehouse.gov/omb/fedreg/print/gpea2.html. May 2, 2000.

Web VoiceID.com; http://tompritchard.com/voiceid/welcome.html, Copyright 2000-2002, pp. 1-3.

"Records Management Guidance for Agencies Implementing Electronic Signature Technologies", National Archives and Records Administration, Oct. 18, 2000; pp. 1-18.

Benjamin Wright, Esq., "The Legality of the PenOp® Signature", PenOp Resource Center, Second Edition, 1994, pp. 1-24.

Kathy Lyons-Burke, "Federal Agency Use of Public Key Technology for Digital Signatures and Authentication", NIST Special Publication 800-25; pp. 1-30. Oct. 2000.

Benjamin Wright, supplement to "The Law of Electronic Commerce", Little, Brown and Company 1991, 1994 supplement pp. 43-45.

Benjamin Wright, "Ceremony™ is a Timely Tool for Satisfying E-Commerce Laws", PenOp Inc, 2000; 3 pages.

Selwood Research, Federal Trade Commission, E-Sign Study—Comment P004102, pp. 1-4. Mar. 16, 2001.

Misner, Robert L. "Tape Recordings, Business Transactions Via Telephone, and the Statute of Frauds," Iowa Law Review, vol. 61, pp. 941-964, 1976.

Congressional Record—Senate, S5284, Jun. 16, 2000.

Ellis Canning Company v. Arthur J. Bernstein. 348 F. Supp. 1212 (D. Colo. 1972).

"Seal-It." J&R Software. http://www.j-r-software.com. Apr. 4, 2002.

Allen v. Wachtendorf, 962 S.W.2d 279 (Tex.App. Corpus Christi 1998).

* cited by examiner

OUTBOUND VOICE SIGNATURE CALLS

CROSS REFERENCE TO RELATED APPLICATION

This application claims priority to U.S. Provisional Application No. 60/420,648 filed Oct. 23, 2002, is a continuation-in-part of U.S. application Ser. No. 10/214,444 filed Aug. 8, 2002, is a continuation-in-part of U.S. application Ser. No. 10/367,964 filed Feb. 19, 2003, and is a continuation-in-part of U.S. application Ser. No. 10/666,534 filed Sep. 19, 2003, each of which is hereby incorporated by reference in its entirety for all purposes.

TECHNICAL FIELD

This disclosure is directed to the use of a voice record as a memorial of certain facts, and, more particularly, to the use of outbound telephone calls to capture information used to create voice records.

BACKGROUND

Every day significant business transactions take place electronically. The Census Bureau of the U.S. Department of Commerce estimates that electronic commerce sales in the United States totaled $9.849 billion during the first quarter of 2002. Typically, transactions are conducted by users selecting desired products or services through a website. The user then provides payment information, such as a credit card number, and acknowledges the transaction by clicking on a button. These transactions may be conducted without requiring physical or electronic signatures.

In 2000, the U.S. enacted electronic signature legislation designed to afford electronic signatures the same legal weight as written signatures. This law allows many transactions required to be in writing to be executed electronically. Despite legal acceptance, it is uncommon to enter into some transactions, such as insurance agreements or real property transactions, using anything other than a written signature.

Much of electronic commerce occurs across the Internet, where consumers have instant access to a plethora of information. Consumers may use an increasing variety of devices to conduct electronic commerce across the Internet such as, for example, computers, mobile phones, and personal digital assistants. For example, using a wireless access protocol (WAP) enabled mobile phone, a user may browse and purchase products for delivery.

While even expensive products may be purchased electronically, some transactions usually are not entered electronically. For example, a consumer desiring an insurance policy for a car, house, or boat may be able to apply for an insurance policy electronically; however, most insurance companies require that submitted information be confirmed and signed in writing before issuing the policy. Some insurance companies may issue temporary binders that terminate in a short period of time unless a signed, written agreement is timely submitted by a customer.

Similarly, real estate transactions are rarely carried out electronically, though a home buyer may identify the house of their dreams through a website, contact the listing real estate agent via email, and apply electronically for a mortgage. Despite the home buyer's reliance on the Internet through the whole process, the transaction closing typically involves the home buyer signing a stack of papers before a notary public.

SUMMARY

In one general aspect, a voice signature system includes a data store, an interface code segment operable to receive identification of information to be signed and a phone number, and a signature process code segment operable to place an outbound telephone call to the phone number and capture a voice recording. The voice signature system is operable to create a voice signature using the voice recording and the identification of information to be signed.

In some implementations, the data store is a database such as a relational database. The identification of information may include, for example, an electronic copy of the information to be signed and/or a title of the agreement. The signature process code activates an interactive voice response system to capture a voice recording.

In another general aspect, a method for creating voice signatures includes receiving an identification of information to be signed, receiving a phone number, placing an outbound call to the phone number, creating a voice recording of at least a portion of the outbound call, and creating a voice signature using the identification of information to be signed and the voice recording.

In another general aspect, a document signing system includes a data communications interface operable to receive a document to be signed and a telephone number, a data store operable to store the document to be signed and the telephone number, a voice communications interface operable to place an outgoing voice signature call, and a processor coupled to the data store, data communications interface, and the voice communications interface. The processor is configured to execute a server application to facilitate signatures of documents by placing outgoing voice signature calls using the voice communications interface.

In another general aspect, a voice signature website includes a web page to receive a document to be signed, a web page to receive a telephone number, and a script operable to call the telephone number and make a voice recording. The voice recording is used to form a voice signature. The web page to receive a document to be signed and the web page to receive a telephone number may be implemented using a single web page.

In some implementations, the script is a server side script and the voice signature includes the document to be signed, the telephone number, and the voice signature.

The details of one or more implementations are set forth in the accompanying drawings and the description below. Other features and advantages will be apparent from the description and drawings, and from the claims.

DETAILED DESCRIPTION

In conducting transactions, one may be asked to sign a document such as, for example, a check, an agreement, or an application form, typically by affixing a written signature to the document. A signature is a symbol adopted with the intent to authenticate a record or document. There are no magical incantations required; it makes no difference whether a signer signs his name, places an arbitrary mark (e.g., an "X"), or draws a picture. The efficacy of the signature rests in the intent of the signer's action.

Just as a written signature may be affixed to a document, a voice record may be created and associated with a document. A voice record is an audio recording that may be used as a memorial of certain facts or as a signature, expressing an intent to affirm a record or transaction for legal purposes. When used as a signature, a voice record may be referred to as a voice signature. As with other types of signatures, the litmus test with voice is the ability to show that a "voice signature" was adopted with the intent to authenticate a record.

Increasingly, electronic devices (e.g., computers, telephones, and personal digital assistants) are capable of recording voice statements. Analog devices such as tape recorders are also capable of recording voice statements. These devices may be used to record an individual's voice to create a voice record showing that a particular person stated particular words. These words may indicate the facts memorialized by the voice record, or may indicate a reference to a certain document or facts.

Figure 1:
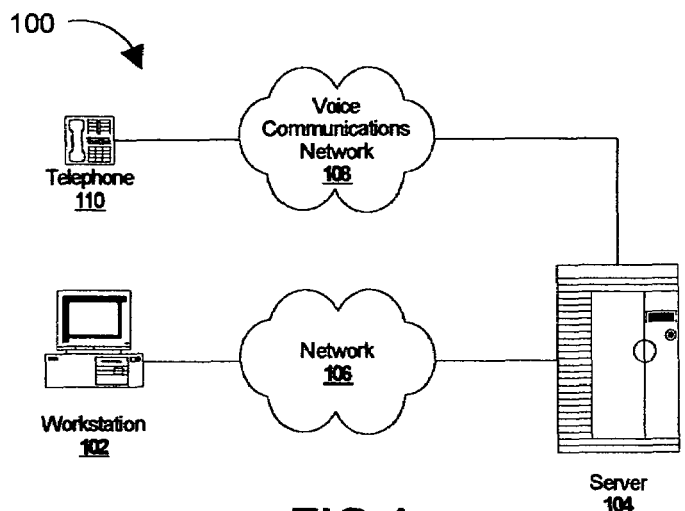
FIG. 1 is an exemplary network architecture for creating an electronic signature corresponding to data.

Referring to FIG. 1, an electronic signature system 100 includes a workstation 102 that accesses a server 104 across a network 106. The workstation 102 is an electronic device capable of sending data to the server 104, such as, for example, a computer, a personal digital assistant, or a cellular phone. The server 104 is a computer capable of facilitating the creation of voice records. The workstation 102 and server 104 communicate across a network 106 which may be implemented using any communication technique such as, a direct cable connection, a local area network such as Ethernet, or a wide-area network such as the Internet. The server 104 is coupled to a voice communications network 108 such that the server 104 may initiate a call to a telephone 110 across the voice communications network 108 for the purpose of recording a voice record. The voice communications network 108 may be implemented using any technology, such as, for example, voice over Internet protocol (VoIP) atop a data network, the public switched telephone network (PSTN), or a wireless voice network. The telephone 110 may be implemented using any device capable of transmitting a representation of a user's voice across the voice communications network 108, including, for example, a telephone, a computer, a mobile phone, or a personal digital assistant. Using the electronic signature system 100, a voice record may be created to represent a statement of intent or a statement of observed fact as described below.

Figure 2:
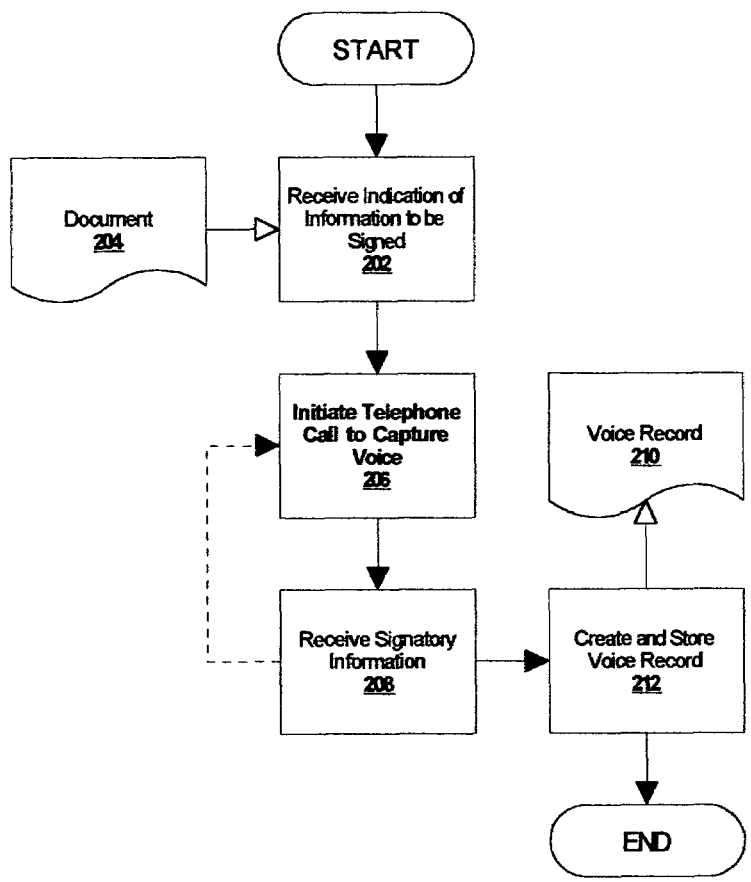
FIG. 2 is a flowchart of a method for creating an electronic signature corresponding to data.

Referring to FIG. 2, a voice record may be created by receiving an indication of information to be signed (step 202), such as, for example, a reference to a document 204, oral agreement, advertisement, offer, or website. This information may be kept in any form and the document 204 may include portions or may be entirely in a non-electronic format. For example, the document 204 may be a paper contract that is mailed or otherwise delivered to the signer. The document 204 may include any information, such as, for example, details of a transaction, a contract, terms of an agreement, an electronic message, and/or the contents of a file.

Once all desired information has been obtained from the signer or from other sources, the electronic signature system 100 then initiates a voice signature call that engages the signer to create a voice recording by telephoning the signer across the voice communications network 108 (step 206). This call may be placed while the signer is accessing the server 104 from workstation 102, or the call may be placed at a later time.

In systems that place calls (step 206) while the signer is still accessing the server 104 through the workstation 102, the server 104 may communicate with the user through the voice communications network 108, through the network 106, or through both. For example, the system 100 may obtain information identifying the signer and the agreement the signer wishes to enter, as well as the signer's telephone number, and use this information to call the telephone number and engage the signer in an interactive voice response (IVR) system to allow the signer to record an audible expression of assent. In this example, the system informs the signer that he is engaged in a signatory process to memorialize the signer's assent. In addition, the system may display error messages in completing the call through the web interface. In this example, an IVR system is used to engage a user in an outbound telephone call; however, any call control technology may be used to engage users, such as, for example, call control extensible markup language (CCXML) scripts.

The electronic signature system 100 receives signatory information from the signer (step 208) through the telephone call, such as, for example, a recording of the signer's voice. This voice recording is used to create and store a voice record 210 that forms a legal signature, recording the signer's manifestation of assent (step 212). The voice recording may use a voice script containing a document identifier, such as that described in U.S. application Ser. No. 10/214,444 filed Aug. 8, 2002, or the system may simply request that the user speak a statement that expresses assent. The process used to record assent may also form a process signature as described in U.S. application Ser. No. 10/367,964 filed Feb. 19, 2003.

Consider, for example, a system 100 that is a website allowing a user to sign loan applications. The user enters various information, including a phone number, and clicks a button to indicate that he wishes to sign a loan agreement. An interactive voice response (IVR) system then places a telephone call to him at the indicated number and steps him through a portion of the signatory process. The IVR system may work independently, or in concert with the web site. For example, the website may display a script for the user to read to record his voice signature or the IVR system may instruct the user to speak a certain phrase.

Initiating calls to the user to capture a voice recording reduces the level of initiative required of the user, possibly providing some or all of the benefits described above. First, by reducing the required user initiative, the voice signature process is less susceptible to distractions that make the user forget to complete the process or allow the user to decide not to complete the signatory process. Second, the system 100 may operate without the user being required to enter, speak, or otherwise give a transaction number or identifier. Because the system 100 initiates the call, the user's voice recording may be matched to the proper transaction without input from the user. In systems requiring a user to initiate calls to an IVR system to record a voice signature, a transaction number also provides some security to prevent malicious callers from "signing" on behalf of unknowing users; however, in this system 100, no such security measures are needed.

Finally, by initiating calls to the user, the system 100 provides some added evidence of the user's assent. If a person later denies having entered into an agreement signed using a voice signature system 100, a voice signature may be used as evidence of their intention to be bound by the agreement. Evidence that the voice recording was made by calling the signer's telephone may help prove the voice signature's authenticity.

This system 100 may be used in a wide variety of applications in addition to capturing legally binding voice signatures, such as, for example, capturing approvals or affirmations. In such a system, it may be useful to provide some authentication that the person is who he or she claims to be. Conventional voiceprint analysis or other biometric techniques may be employed with this system to add an additional authentication layer.

Figure 3:
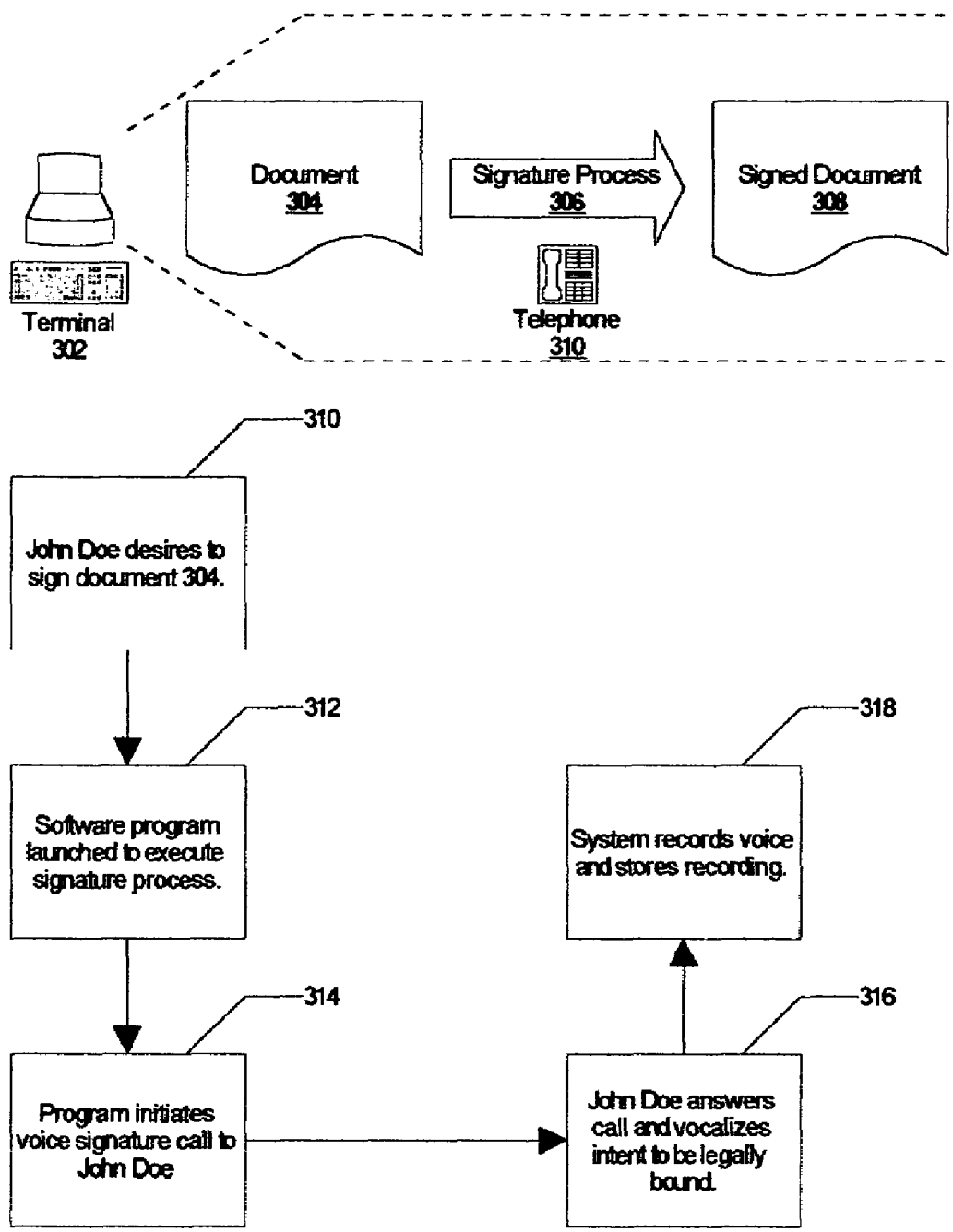
FIG. 3 is a diagram of document execution and verification in an electronic signature system.

Some implementations utilize voice recognition software integrated with the system 100 to ensure that captured voice recordings match the script. Users are given messages or scripts to read during the voice capture process. Using voice recognition techniques, the system 100 can determine whether the user read the correct script or message. FIG. 3 depicts an exemplary electronic signature system 100 for capturing intentions to enter into insurance policy agreements. In this implementation, an insurance customer, John Doe, desires to purchase a homeowner's policy with policy limits of $123,456 for personal property and $345,678 for the house itself.

John Doe uses a computing device equipped with a web browser and access to a data network to access a website built using, for example, Active Server Pages (ASPs) to provide a signature form using a system developed using conventional web development applications, such as Microsoft Visual InterDev. The system may be deployed using the Microsoft Internet Information Server (IIS) running on a Dell PowerEdge 300SC with the following specifications: 2 Intel Pentium III processors at 800 MHz; 100 MHz Front Side Bus; 32 KB Level 1 cache; Intel 330BX chipset; 128 MB 100 MHz PC 100/PC 133 ECC SDRAM; and 10 GB Hard Drive. For security purposes, the server may be deployed behind a firewall and/or proxy server.

The system may display a variety of information about various policies sold by the insurance company. When John Doe wishes to enter into one of the available policies, the system collects information to complete the transaction. When John Doe is ready to sign the agreement, the system presents a form so that he may enter certain information about the policy, such as, for example, the policy limits. John Doe enters information such as that shown below in Table 1.

TABLE 1

| Prompt | User Input |
| --- | --- |
| Record Owner: | John Doe |
| Input 1: | $123456 |
| Input 2: | $345678 |
| Address: | One Wilson Avenue |
| City: | Jackson |
| State: | Mississippi |
| Zip Code: | 39110 |

After entering this data, John Doe selects a button at the bottom of the form to submit the data for processing. The data is recorded in a Microsoft SQL Table, assigned a record number "22," and a signature program is called to execute the signing process.

The program calls a server side script that pulls the data from the SQL Table and presents John with a web page that includes the text shown below in Table 2.

Here, the name and the document number are pulled from the SQL Table and inserted into the following script: "My name is <insert name> and I hereby sign document number <insert number> with intent to be legally bound."

John Doe enters his telephone number, 1-123-XXX-XX and clicks on the "submit" button. The telephone number is recorded in the SQL table such that it is associated with document number 22. The signature program pulls the telephone number and submits it to an interactive voice response program, which initiates a telephone call to the number. When John Doe answers the call, he is automatically instructed to recite the message at the sound of a "beep." If John does not answer the call or otherwise fails to complete the signatory process, the system may either retry or fail. If John would like to complete the process, he recites the message "my name is John Does and I hereby sign document number 22 with intent to be legally bound" after the beep. The interactive voice response system records John's words in electronic format (e.g., .wav format) and stores information in the SQL table in association with document number 22.

TABLE 2

Document Number: 22
Record Owner: John Doe
Input 1: $123456
Input 2: $345678
Address: One Wilson Avenue
City: Jackson
State: Mississippi
Zip Code: 39110
If this information is accurate, you can initiate a process to sign this document by entering your telephone number below. Then, an automated telephone call will be made to you. When you receive it, you should recite the following message: "My name is John Doe and I hereby sign document number 22 with intent to be legally bound."
Enter your telephone number here: _____ [click submit]

Two years later an auditor wishes to confirm that John Doe did in fact agree to the insurance policy as confirmed by a voice record. The auditor takes the data on file in the SQL table and determines the message that should have been read. The expected message is compared to the spoken contents of the voice record. The auditor listens to the sound of the voice record to judge—based on prior personal experience with the voice of John Doe—whether it is in fact the voice of teller John Doe. If the codes all match, and if the voice sounds like that of John Doe, then the auditor possesses substantial accounting evidence that the transaction was entered and controlled by John Doe, and not someone else. In addition, the auditor reviews the telephone number stored in the SQL table and uses the number to further authenticate the voice record.

Figure 4:
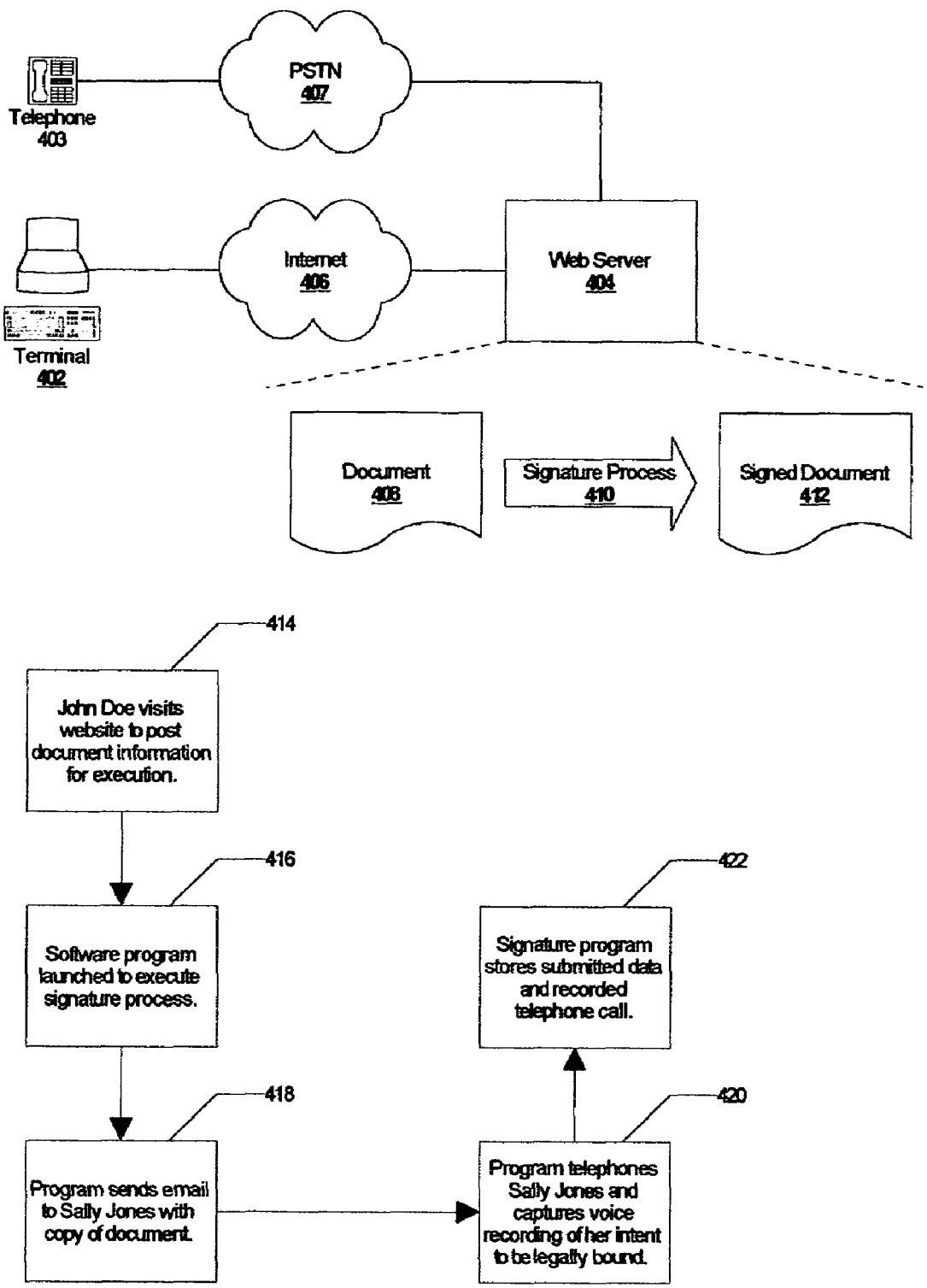
FIG. 4 is a diagram of a document execution system allowing users to upload documents to be executed and employing outbound voice signature telephone calls.

Referring to FIG. 4, an exemplary voice signature system allows users to upload digital files for execution using a signature process employing outbound telephone calls to capture voice recordings.

In this example, John Doe and Sally Jones agree in principle to the terms of a sales agreement. John Doe drafts a sales contract incorporating these terms and prepares it for Sally Jones to execute. Using the voice signature system, John uses a web browser, such as, for example, Internet Explorer, running on a Sony Vaio laptop computer to access the voice signature system server application created using Microsoft Visual InterDev and deployed on an Internet Information Server (IIS). The IIS web server runs on a Dell PowerEdge 300SC with the following specifications: 2 Intel Pentium III processors at 800 MHz; 100 MHz Front Side Bus; 32 KB Level 1 cache; Intel 330BX chipset; 128 MB 100 MHz PC 100/PC 133 ECC SDRAM; and 10 GB Hard Drive. For security purposes, the server may be deployed behind a firewall and/or proxy server.

When John accesses the voice signature system website, he is presented a form allowing him to upload any digital file for execution. Following the provided instructions, John uploads a Microsoft Word document containing a sales contract between himself and Sally Jones. John also provides information regarding the parties including his name and email address, and Sally's name, email address, and telephone number. He also gives the document a title.

When John clicks on a "submit" button, the file is uploaded and the data is processed and loaded into a database. In this example, the data is recorded in an SQL table and a signature program is called to execute the signing process. The signature program calls a server side script that pulls data from the SQL table and sends an email message to Sally's email address. The email message informs Sally that John has requested that she sign the uploaded document (also attached to the email message). The text further instructs her as follows: "An automated call will be placed to your telephone. You will be given instructions to sign the document."

The email also provides a link to a web page that allows Sally to schedule the phone call to be made at a time convenient to her. Unless Sally chooses another time, the signature program begins one hour after the email message is sent to Sally, the signature program pulls the telephone number from the SQL table and submits it to an interactive voice response program to initiate a voice signature telephone call to Sally. If Sally does not answer or otherwise complete the signature process, the system sends an email to Sally asking her to specify a time to complete the signature process.

When Sally answers a voice signature call, she hears an automated voice instructing her that during this call she will be able to sign a document sent to her via email. The automated voice further instructs her aurally that to sign the document, she should repeat the following words, during the pauses, so that they may be recorded: "I, Sally Jones, hereby sign the Sales Contract between Doe and Jones with intent to be legally bound." Here, the name and document title have been pulled from the SQL table and inserted into the following script: "I <insert name> hereby sign the <insert document title> with intent to be legally bound."

When Sally speaks the words, the interactive voice response system records them in an electronic format (e.g., .wav format) and stores them in the SQL table in association with the data John had originally submitted.

Now that the voice signature is complete, the signature program pulls email addresses for John and Sally out of the SQL table and sends a confirmation of the voice signature to both John and Sally, attaching the .wav file recording of Sally's voice. This recording may be used at a later point in time to prove that Sally agreed to the terms set forth in the sales contract.

The examples above describe the use of outbound calling to capture voice signatures. The use of the term "voice signature" above is not intended to be limited to legally binding electronic signatures. In this disclosure, "voice signatures" also include affirmations, approvals, assertions, or any other statements or averments where at least a portion is made orally. For example, one skilled in the art would appreciate that the voice signature system described above could be used to capture voice approvals of purchase order requests, confirmations of instructions, etc.

A number of implementations have been described. Nevertheless, it will be understood that various modifications may be made without departing from the spirit and scope of the invention. Accordingly, other implementations are within the scope of the following claims.

What is claimed is:

1. A voice signature system comprising:
   a data store;
   an interface code segment that receives identification of information to be signed and a phone number; and
   a signature process code segment that places an outbound telephone call to the phone number and captures a voice recording,
   wherein the voice signature system is creates a voice signature using the voice recording and the identification of information to be signed.

2. The voice signature system of claim 1 wherein the data store is a database.

3. The voice signature system of claim 2 wherein the data store is a relational database.

4. The voice signature system of claim 1 wherein the identification of information includes an electronic copy of the information to be signed.

5. The voice signature system of claim 1 wherein the identification of information to be signed includes a title of an agreement.

6. The voice signature system of claim 1 wherein the signature process code activates an interactive voice response system to capture a voice recording.

7. A method for creating voice signatures comprising:
   receiving an identification of information to be signed;
   receiving a phone number;
   placing an outbound call to the phone number;
   creating a voice recording of at least a portion of the outbound call; and
   creating a voice signature using the identification of information to be signed and the voice recording.

8. The method of claim 7 wherein the identification of information to be signed includes an electronic copy of the information to be signed.

9. The method of claim 7 wherein the identification of information to be signed includes a title of an agreement.

10. The method of claim 7 wherein placing an outbound telephone call includes placing a telephone call using the public switched telephone network (PSTN).

11. The method of claim 7 wherein placing an outbound telephone call includes placing a telephone call across a data network.

12. The method of claim 7 wherein placing an outbound telephone call includes using an interactive voice response system.

13. The method of claim 7 further comprising:
   providing a message to be read during the outbound call to the phone number; and
   using voice recognition on the voice recording to determine if the message was read during the outbound call to the phone number.

14. The method of claim 7 further comprising performing voiceprint analysis on the voice recording to determine a speaker.

15. A document signing system comprising:
   a data communications interface that receives a document to be signed and a telephone number;
   a data store that stores the document to be signed and the telephone number;
   a voice communications interface that places an outgoing voice signature call; and
   a processor coupled to the data store, data communications interface, and the voice communications interface, and configured to execute a server application to facilitate signatures of documents by placing outgoing voice signature calls using the voice communications interface.

16. The document signing system of claim 15 wherein the data communications is a network interface card.

17. The document signing system of claim 15 wherein the data store is a database.

18. The document signing system of claim 15 wherein the voice communications interface is an interactive voice response system.

19. A voice signature website comprising:
- a web page to receive a document to be signed;
- a web page to receive a telephone number; and
- a script that calls the telephone number and make a voice recording, wherein the voice recording is used to form a voice signature.

20. The voice signature website of claim 19 wherein the web page to receive a document to be signed and the web page to receive a telephone number are the same web pages.

21. The voice signature website of claim 19 wherein the script is a server side script.

22. The voice signature website of claim 19 wherein the voice signature includes the document to be signed, the telephone number, and the voice signature.

* * * * *